Figure 1:
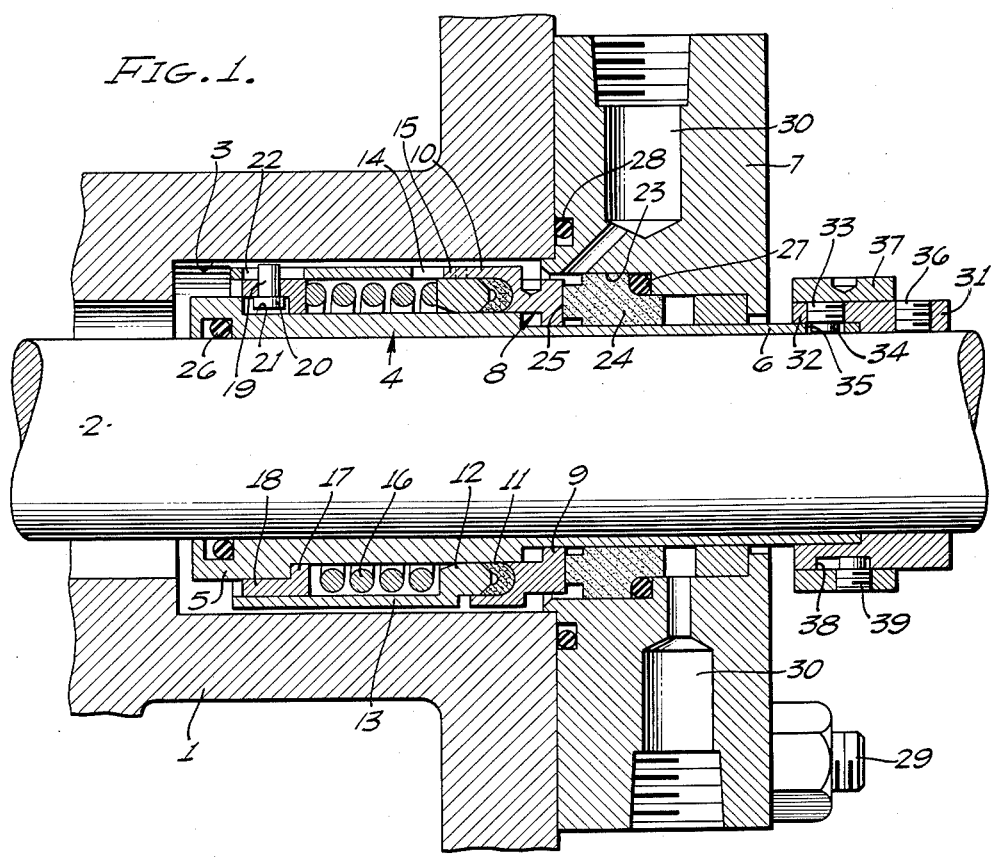

July 3, 1962 H. E. TRACY 3,042,414
PRESETTING MEANS FOR MECHANICAL SEALS
Filed Dec. 31, 1956

HERBERT E. TRACY
INVENTOR.

BY
ATTORNEY

United States Patent Office 3,042,414
Patented July 3, 1962

3,042,414
PRESETTING MEANS FOR MECHANICAL SEALS
Herbert E. Tracy, Alhambra, Calif., assignor to Borg-Warner Corporation, Chicago, Ill., a corporation of Illinois
Filed Dec. 31, 1956, Ser. No. 631,824
7 Claims. (Cl. 277—11)

The present invention relates to mechanical seals and more particularly to presetting means for mechanical seals whereby installation of the seals is facilitated and the necessity of making preinstallation measurements is obviated.

Mechanical seals for use in lieu of shaft packings for pump or other rotatable shafts are well known. One type of such seal comprises a shaft sleeve adapted to encircle the rotatable shaft and to be secured thereto for rotation therewith in a predetermnied axial relationship to the shaft. Shiftably disposed upon the shaft sleeve is an axially moveable sealing ring or element which is spring pressed into engagement with a relatively stationary sealing ring or element carried by a seal flange which is adapted to be secured to the pump casing about the shaft and sleeve.

The pressure of the spring upon the shiftable sealing ring or element is controlled and determined by the position in which the sleeve is initially set upon the shaft. Therefore, it has been the common practice to make certain measurements of the sleeve in relation to the face of the pump housing against which the seal flange abuts, and based upon the knowledge of the proper axial dimension of the seal parts encircling the shaft and sleeve, the position of the sleeve on the shaft may be determined. This is necessary because a shoulder on the sleeve is employed as the means for precompressing the spring which urges the sealing rings into engagement, and if the shaft sleeve is not properly positioned, the proper pressure will not be applied to the seal rings by the spring.

Of course, it would be wholly desirable to provide means enabling an ordinary unskilled mechanic to install a mechanical seal with a high degree of certainty that the spring would be properly precompressed, without the necessity for making accurate measurements and without necessitating more than a limited knowledge of the seal itself.

Accordingly, a primary object of the present invention is to provide means for presetting the seal so that the sleeve will be in a proper axial relationship to the shaft without requiring the making of any measurements.

Another object is to provide a mechanical seal with a presetting ring which acts as a gauge for predetermining the proper axial relationship of the shaft and shaft sleeve.

Specifically, it is an object of the invention to provide a mechanical seal having novel spring compressing means comprising a shaft sleeve collar which is adapted to be connected to the shaft sleeve and to be slidably engaged with said shaft so that when the seal is installed the shaft sleeve collar may be moved axially with respect to the shaft to precompress the seal spring or springs, as the case may be; said shaft sleeve collar having a presetting or positioning ring co-axially mounted thereon for axial movements relative thereto within predetermined limits, whereby when the presetting ring is shifted to the limit of its movement in one direction, it is adapted to engage with the contiguous portion of the seal flange, and movement of the shaft sleeve collar to the limit of its movement relative to the presetting ring will precompress the spring a predetermined amount, and the shaft sleeve collar may then be fixed on the shaft to lock the shaft sleeve in position.

Other objects and advantages of the invention will be hereinafter described or will become apparent to those skilled in the art and the novel features thereof will be defined in the appended claims.

Figure 2:
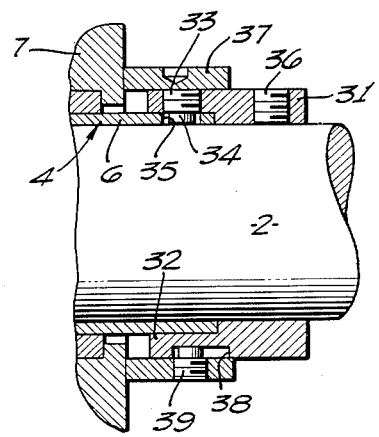

In the accompanying drawing:

FIG. 1 is a longitudinal sectional view of a mechanical seal embodying the presetting means of the invention; and FIG. 2 is a fragmentary view in section showing the presetting means employing the presetting ring as a gauge.

Like reference characters in the figures of the drawings and in the following description designate corresponding parts.

Referring particularly to FIG. 1, there is shown a portion of a pump or other housing 1 having a rotatable shaft 2 projecting therefrom through a seal chamber 3. An illustrative mechanical seal assembly is shown upon the shaft 2 within the seal chamber 3, this seal assembly including a shaft sleeve 4 co-axially mounted upon the shaft 2. The sleeve 4 is provided at its inner extremity with a radially enlarged portion 5 and at its outer extremity the sleeve 4 is provided with a reduced axially extended section 6 which projects outwardly of the housing through a central opening in a seal flange 7.

Encircling the sleeve 4 is a sealing ring generally designated 8 having an outer end flange 9 constituting a sealing portion slideably disposed on the reduced sleeve section 6 of the shaft sleeve. This ring 8 also has an axially extended portion 10 encircling the central body of the sleeve 4. In the vicinity of the juncture of the flange 9 and the axially extended portion 10, the member 8 is provided with an annular arcuate seat in which is disposed an annular expandable seal or packing ring 11, this ring 11 being disposed between the inner periphery of the axially extended portion 10 and the outer periphery of the shaft sleeve 4.

Slideably mounted uopn the shaft sleeve 4 is an expander ring 12 adapted to expand the seal 11 in its seat, this expander 12 having an axial sleeve-like extension 13 extending substantially to the inner extremity of the shaft sleeve 4. At its outer end, the sleeve-like portion 13 of the expander 12 is provided with a siutable number of axially extended notches 14 adapted to receive a like number of lugs or tangs 15 on the portion 10 of the sealing ring 8 so that the elements 8 and 10 are keyed together for unitary rotation but are free for relative axial movement.

A coiled compression spring 16 also encircles the shaft sleeve 4 between the shaft sleeve and the expander sleeve 13. The spring 16 engages at one end with the expander 12 and is backed up at its other end by an annular flange 17 on a seal driving insert 18 which is interposed between the expander sleeve 13 and the shaft sleeve 4. A drive pin 19 is carried by the drive insert 18 and preferably has a headed end 20 disposed in a notch 21 axially extended in the outer periphery of the enlarged end 5 of shaft sleeve 4, with the stem of the drive pin 19 projecting into an axially extended slot 22 in the inner end portion of the expander sleeve 13. Thus, the shaft sleeve 4 is connected to the expander sleeve 13 which is in its turn connected to the seal member 8 so that these elements are all rotatable as a unit, but so that each of these elements is axially shiftable with relation to the other.

For sealing engagement with the seal ring 8, the seal flange 7 is provided with a chamber 23 in which is supported a relatively stationary seal ring 24 which is preferably composed of carbon. The seal rings 8 and 24 are respectively provided with sealing faces which are lapped to a mirror finish for efficient sealing contact at 25. Thus, fluid passing into the seal chamber 3 is precluded from passing therefrom by the sealing contact of the rings 8 and 24, and in order to prevent the passage of fluid between the shaft sleeve 4 and the shaft 2, an O ring seal 26 is preferably employed in the vicinity of the enlarged end 5 of the sleeve 4.

In order to prevent the passage of fluid from the chamber 3 past the outer periphery of the seal ring 24, an O ring seal 27 is interposed between said seal ring 24 and the walls of the chamber in which it is disposed.

Finally, a further O ring seal 28 is interposed between the contacting surfaces of the housing 1 and the seal flange 7 and clamped in place as the seal flange 7 is secured to the housing by a suitable number of fasteners 29. As desired, suitable ports as at 30 may be provided for admitting injection, quench, or other fluids into the seal chamber 3, or draining pump, quench, or other fluids therefrom.

In use, a seal constructed in accordance with the foregoing would ordinarily be installed by first securing the shaft sleeve 4 to the shaft 2 by the utilization of conventional means (not shown). Thereafter, the rotatable seal element 8 and its related parts which are disposed about the shaft sleeve 4 would be placed thereon and the seal flange 7 then secured to the casing 1. In order for the seal to be effective, however, it would have been necessary for the shaft sleeve 4 to be preset upon the shaft 2 at a rather precise axial position so that spring 13 would be placed under compression and so that expander sleeve 13 would be free for axial movement for pressing the seal ring 24 axially towards the seal ring 8 to effect a proper seal and to take up wear of the seal rings as it occurs. Such precise presetting of the shaft sleeve 4 heretofore has required the taking of precise measurements of the parts by a mechanic. However, by virtue of the present invention, such presetting operation has been greatly simplified.

In accordance with the invention, a shaft sleeve collar 31 of annular form is disposed about the portion of the shaft 2 exteriorly of the sleeve 4, the collar 31 having an axial extension 32 overlying the outer extremity of the shaft sleeve 4. Extending radially through the portion 32 of the collar 31 is a connecting screw or pin 33 having an unthreaded end portion 34 adapted to engage in a complimental socket or opening 35 in the sleeve 4 so as to connect these parts together. The collar 31 is also provided with a set-screw 36 adapted to engage the shaft 2 to secure the collar 31 and consequently the sleeve 4 in a selected position with respect to the shaft 2 as may be required to place the spring 16 under initial compression.

In order to accurately gauge or determine the proper setting of the collar 31, a presetting ring or gauge ring 37 is co-axially mounted upon the collar 31, and the outer periphery of the collar 31 is provided with an axially extended groove or slot 38 for receiving an end of set-screw 39 carried by the presetting ring 37. The opposite ends of the slot 38 determine the extent of relative axial movement of the collar 31 and the presetting ring 37, and accordingly will determine the presetting or precompression of the spring 13.

In use, the shaft sleeve collar 31 and the presetting ring 37 are positioned one on the other with the set-screw 39 disengaged from the base of the slot 38 so that these members are freely movable axially with relation to one another. In addition, the set-screw 36 will be disengaged from the shaft 2 so that the spring 16 will be fully expanded and the collar 31 will be in contact with the outer surface of the flange 7.

Accordingly, with the parts in this condition, the collar 31, and consequently the sleeve 4, may be shifted axially in a spring-compressing direction until such time as the inner end of the set-screw 39 engages with the end of the slot 38 as seen in FIG. 2. Thereupon the set-screw 36 may be tightened to fix the position of the sleeve 4 upon the shaft 2 and the presetting or gauge ring 37 may then be moved axially to the position shown in FIG. 1 and the set-screw 39 set against the base of the gauging slot 38 to retain the presetting ring 37 in an out-of-the-way position. This operation obviously is quite simple and does not require the services of a skilled mechanic, and with a minimum of instruction, the seal may be installed and the spring 16 precompressed to a point where the drive pin 19 is substantially disposed mid-way of the slot 22 of the sleeve-like portion 13 of expander 12, this being the proper working relationship of these parts.

While the specific details of the invention have been herein shown and described, changes and alterations may be made therein without departing from the spirit thereof as defined in the appended claims.

I claim:

1. In a seal assembly of the class described including a housing providing a seal chamber, a shaft projecting from said housing through said chamber, sealing means in said chamber for preventing the passage of fluid from said housing along said shaft including a sleeve co-axially mounted upon said shaft, and means for effecting operation of said sealing means, including spring means adapted to be placed under compression responsive to movement of said sleeve on said shaft, that improvement wherein said sleeve projects axially from said housing, and including means interconnected with said sleeve exteriorly of said housing for shifting said sleeve relative to said shaft, gauge means shiftably carried by said sleeve shifting means and engageable with said housing, said gauge means and said shifting means having means for limiting movement of said shifting means and consequently said sleeve, and means for securing said shifting means in a selected position on said shaft.

2. In a seal assembly of the class described including a housing providing a seal chamber, a shaft projecting from said housing through said chamber, sealing means in said chamber for preventing the passage of fluid from said housing along said shaft including a sleeve co-axially mounted upon said shaft, and means for effecting operation of said sealing means, including spring means adapted to be placed under compression responsive to movement of said sleeve on said shaft, that improvement wherein said sleeve projects axially from said housing, and including means interconnected with said sleeve exteriorly of said housing for shifting said sleeve relative to said shaft, gauge means operatively connected to said sleeve shifting means for limiting movement of said shifting means and consequently said sleeve, and means for securing said shifting means in a selected position on said shaft, said sleeve shifting means comprising a collar connected to said sleeve, and said gauge means comprising a ring co-axially mounted upon said collar, and means interengaged with said collar and said ring for limiting relative axial movement thereof.

3. In a seal assembly of the class described including a housing providing a seal chamber, a shaft projecting from said housing through said chamber, sealing means in said chamber for preventing the passage of fluid from said housing along said shaft including a sleeve co-axially mounted upon said shaft, and means for effecting operation of said sealing means, including spring means adapted to be placed under compression responsive to movement of said sleeve on said shaft, that improvement wherein said sleeve projects axially from said housing, and including means interconnected with said sleeve exteriorly of said housing for shifting said sleeve relative to said shaft, gauge means operatively connected to said sleeve shifting means for limiting movement of said shifting means and consequently said sleeve, and means for securing said shifting means in a selected position on said shaft, said sleeve shifting means comprising a collar connected to said sleeve, and said gauge means comprising a ring co-axially mounted upon said collar, and means interengaged with said collar and said ring including a pin carried by one part, the other part having a slot into which said pin projects for engagement with the latter part at the opposite ends of said slot for limiting relative axial movement of said collar and presetting ring.

4. A device of the class described, comprising a wall, a shaft projecting through said wall, an annular member shiftably mounted on said shaft, and means for setting said annular member on said shaft in a predetermined position relative to said wall, said means comprising a ring encircling said annular member for relative axial movement thereof, means for limiting such axial movement in opposite directions whereby when said ring is engaged with said wall, said annular member is limited in its movement in one direction so as to be located in a predetermined position on said shaft, and means for securing said annular member on said shaft in such predetermined position.

5. A device of the class described, comprising a wall, a shaft projecting through said wall, an annular member shiftably mounted on said shaft, and means for setting said annular member on said shaft in a predetermined position relative to said wall, said means comprising a ring encircling said annular member for relative axial movement thereof, means for limiting such axial movement in opposite directions whereby when said ring is engaged with said wall, said annular member is limited in its movement in one direction so as to be located in a predetermined position on said shaft, and means for securing said annular member on said shaft in such predetermined position, the means for limiting relative axial movement of said annular member and said ring including a projection on one part and an axially extended slot on the other part into which said projection projects.

6. A device of the class described, comprising a wall, a shaft projecting through said wall, a sleeve shiftably mounted on said shaft and having an end disposed adjacent to said wall, and means for setting said sleeve on said shaft in a predetermined position relative to said wall, said means including a collar connected to said sleeve end, a gauge ring encircling said collar for relative axial movement thereof, means for limiting such relative axial movement in one direction so that said collar and sleeve are disposed in a predetermined position on said shaft when said ring is engaged with said wall, and means for fixing said collar on said shaft in such position.

7. A device of the class described, comprising a wall, a member projecting through said wall, and means for setting said member in a predetermined position relative to said wall, said means comprising a pair of annular elements co-axially mounted one upon the other, one of said elements being engageable with said wall and the other of said elements being fixed to said member, and means for limiting relative axial movement of said elements in one direction.

References Cited in the file of this patent

UNITED STATES PATENTS

| | | |
|---|---|---|
| 1,008,398 | Willcox | Nov. 14, 1911 |
| 2,682,422 | McBride | June 29, 1954 |
| 2,797,940 | Michener et al. | July 2, 1957 |